United States Patent

[11] 3,612,775

[72] Inventor Robert J. Miller
Salford, Pa.
[21] Appl. No. 842,270
[22] Filed July 16, 1969
[45] Patented Oct. 12, 1971
[73] Assignee Sperry Rand Corporation
New York, N.Y.

[54] MAGNETIC TRANSDUCING HEAD ASSEMBLY WITH HEAD LEVEL ADJUSTMENT
5 Claims, 5 Drawing Figs.

[52] U.S. Cl. .......... 179/100.2 P, 340/174.1 E
[51] Int. Cl. .......... G11b 21/24, G11b 21/20, G11b 5/60
[50] Field of Search .......... 179/100.2 C, 100.2 CA, 100.2 P; 340/174.1 F, 174.1 E; 346/74 MC

[56] References Cited

UNITED STATES PATENTS

| | | | |
|---|---|---|---|
| 3,177,495 | 4/1965 | Felts | 340/174.1 |
| 3,351,925 | 11/1967 | Van Lammeren et al. | 340/174.1 |
| 3,528,067 | 9/1970 | Linsley et al. | 340/174.1 |

*Primary Examiner*—Bernard Konick
*Assistant Examiner*—Alfred H. Eddleman
*Attorneys*—Charles C. English, William E. Cleaver and Sheldon Kapustin

ABSTRACT: A so-called "flying head" structure is disclosed which includes a hollow housing member into which a head block is fitted. A flexure spring contained within the housing urges the head block away from the housing toward the recording medium.

INVENTOR
ROBERT J. MILLER
BY Charles E. Englisch
AGENT

MAGNETIC TRANSDUCING HEAD ASSEMBLY WITH HEAD LEVEL ADJUSTMENT

The flexure spring is bifurcated and attached to a concave anchor surface by a pair of individually adjustable screws to vary separately the bias on each tine whereby the external surface of the magnetic head may be leveled.

This invention relates to magnetic transducer assemblies and in more particular to the so-called "flying head" type of assembly which is especially well suited to magnetic disc and/or drum storage devices.

Magnetic head assemblies of the "flying head" type are now well known in the art and have been utilized successfully for a number of years. One very successful type flying head structure is shown in U.S. Pat. No. 3,202,772.

Although such assemblies operate quite satisfactorily they are usually expensive to construct and difficult to adjust. In addition, they generally include expensive head raising and lowering mechanisms which are utilized during the drum or disc startup and shutdown times to retract the head from the recording medium and then to lower the head after the drum or disc has reached its operating speed. These mechanisms add to the initial cost of the head structure and to its maintenance problem. It is, therefore a purpose of the present invention to avoid such expensive mechanisms and to provide a simple, inexpensive readily adjustable head assembly.

Also, in the past the flying head generally incorporated in its construction a fragile loading and/or bias spring mechanism. These spring mechanisms are often quite delicate and are easily damaged during operation or maintenance. It is accordingly another purpose of this invention to provide a simple assembly wherein the bias or loading spring is protected by the head-supporting structure itself against damage.

BRIEF SUMMARY OF INVENTION

In accordance with the teaching of this invention, a head block which contains a suitable transducing element is spring supported within an open ended tubularlike housing. The housing which in the preferred embodiment of this invention is rectangular in section has an aperture formed in one wall thereof adjacent one end. The head block, which again in the preferred embodiment may have a rectangular shape, is inserted within the aperture. A bias spring which may be a flexure or leaf-type spring is mounted within the housing and pushes against the internal face of the head block so as to urge the latter element outwardly from the housing into engagement with the recording disc or drum associated with the head. In this respect the flexure spring is mounted or attached to the inside of the housing at one end thereof and runs lengthwise of the housing to engage the head block. Interposed between the head block and the spring is a ball-shaped pivot bearing. The pivot bearing is arranged to permit the head block to rock about two mutually perpendicular axes and at the same time to restrain the head from rocking about the third mutually perpendicular axis. The thus assembled structure protects the delicate bias spring by mounting the spring within the housing and the housing further provides a suitable protective mount for the head block. The aperture in the housing slightly clears the head block and provides an automatic stop limit to the rotational and translational movements of the head during maintenance and handling.

Other and more specific objects of the present invention will become apparent upon careful consideration of the following detailed description when taken in connection with the accompanying drawings, in which FIG. 1 shows an elevational view of the underside of the head block used in this invention;

Figure 1:
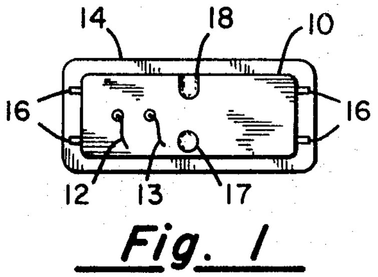

Reference is now made to the drawings where the reference numeral 10 represents a rectangularly shaped head block which may be made of aluminum or other nonmagnetic material. Mounted in the head block near one end thereof is a suitable magnetic transducer element 11. In practice, the transducer element 11 may be a laminated core structure made of high permeability steel containing a suitable recording gap 11*a*. The transducer element 11 which may be held in the block 10 by a suitable potting compound, includes a read/write winding the leads for which are shown at 12 and 13 wound on the core of the transducer element 11. The head block 10 has an external face which comprises an integral or otherwise formed flange plate 14 which operates to provide a good aerodynamic surface for the head block 10. The flange plate 14 is flat if the head is to operate with a disc but may be concave in shape if the head is to operate with a drum.

Figure 3:
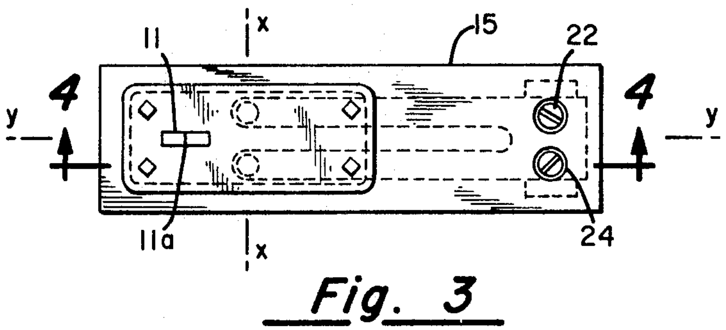
FIG. 3 is a top elevational view showing the head block mounted within the housing of this invention.
Figure 4:
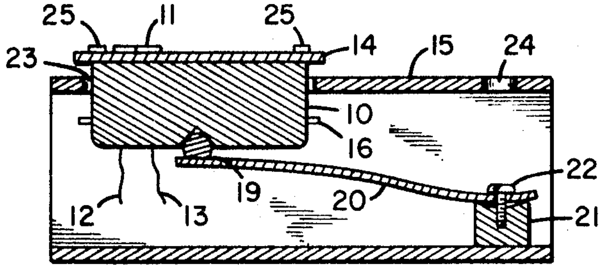
FIG. 4 is a cross-sectional view taken along the lines 4—4 of FIG. 3.

The housing for the head block 10 is shown at 15 in FIGS. 3 and 4. This member, which is preferably rectangular in section, is also made of nonmagnetic material and contains a rectangular shaped aperture 23 located at one end thereof. Inserted in the aperture 23 is the head block 10. The aperture 23 is slightly larger than the block 10 to permit the block 10 to move freely in an axial direction in the aperture 23 and at the same time to restrict its rotational movements. The flange plate 14 extends over the sides of the block 10 as shown in the drawings to prevent the head block 10 from dropping down into the housing 15; while the stop pins 16, spaced about the perimeter of the block near the internal face thereof, prevent the head block 10 from inadvertently being pushed out of the housing 15 by the spring 20.

Milled into the bottom face of the head block 10 at its balance point is a conically tapered hole 17 and a tapered slot 18 as shown in FIG. 1. The hole 17 and slot 18 are adapted to engage the respective pivot balls 19 mounted at the ends of the bifurcated flexure spring 20 shown in FIG. 2.

The flexure spring 20 as shown in FIG. 4 may be screw mounted to a pillar block 21 contained within the housing 15. The pillar block 21 has, as shown in FIG. 4, a concave surface which provides via the screws 22 a suitable device for adjusting the pressure applied to the head block 10 by the spring 20. To permit this adjustment, suitable screwdriver openings 24 are formed in the housing 15 above the screws 22. By taking down or letting up on the screws 22, the amount of pressure applied to the head block 10 by flexure spring 20 may be adjusted and the clearance and flight characteristics of the head block 10 relative to the recording medium may be set.

Figure 5:
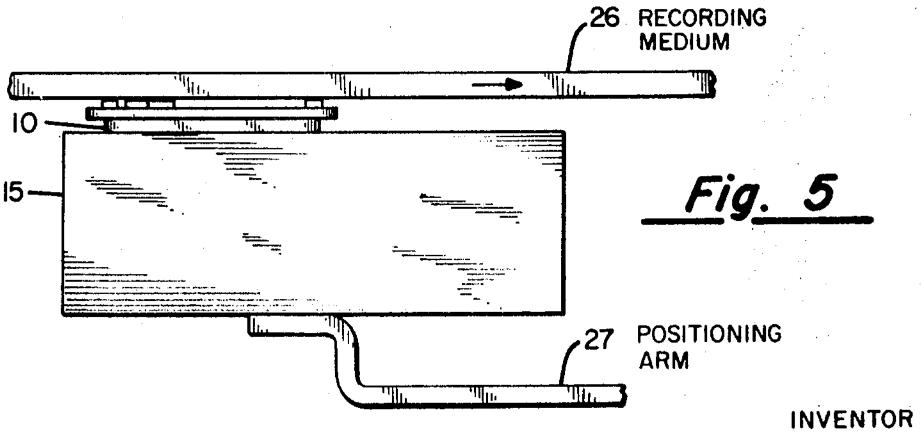
FIG. 5 is a side elevational view of the invention shown in connection with a magnetic recording disc.

Mounted on the flange plate 14 are several sapphire or similar hard material bearing pads 25 which project outwardly from the flange plate 14 by a distance approximately equal or slightly longer than the projection distance of the head 11. These bearings 25, which for purposes of illustration have been shown as located at the four corners of the plate 14, ride on the surface of the recording medium 26 as shown in FIG. 5 during the start up and stopping times of the recording medium and thus protect the head 11 from damage during these instances.

A suitable positioning mechanism, such as a positioning arm 27, is used to support the housing 15 and its associated head block assembly. This positioning mechanism, which is not shown, is adapted to position the head mechanism at different radial points on the disc 26 with the transverse axis *x—x* (FIG. 3) of the head block oriented so as to lie along a radius of the disc, while the longitudinal axis *y—y* lies parallel to the tangent line of the disc.

In operation when the disc 26 is in a stationary position, the head block 10 is urged by spring 20 to contact the recording medium 26. After the disc has reached approximately 1 to 10 percent of its speed the air flowing between the disc 26 and the flange plate 14 creates a hydrodynamic film which causes the head block assembly 10 to lift off the surface of the recording disc. Through the adjustment of the spring 20 the speed at which the head starts to "fly" and the clearance of the head to the disc during operation can be controlled. The clearance in a typical installation when the head is flying may be as small as 5 microinches.

Figure 2:
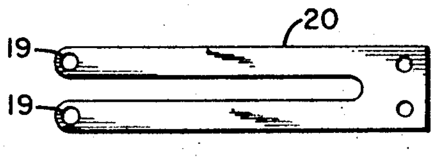
FIG. 2 is an elevational view of the flexure spring used to support the head block of this invention.

The pivot bearings 17, 18 and 19 together with the compliance of the spring member 20 permits the head block to freely rock about both its transverse axis *x—x* and its longitudinal *y—y* axis and thereby permits the head block to follow surface irregularities in the disc 26. At the same time the pivot bearings 17, 18 and 19 restrain the head block 10 from twisting about the axis normal to the disc 26. By using a bifurcated spring 20 as shown in FIG. 2, the compliance of the spring to permit a rocking motion about the longitudinal axis *y—y* is improved over a single wide spring. Also the two adjusting screws 22 permit the pressure applied to the head block 10 by the two arms of the spring 20 to be adjusted individually thereby to permit the head to be levelled on the disc 26.

The housing 15, it will be seen, provides not only a support for the head block 10 and its bias spring 20 but also since it essentially encloses these elements it operates to provide a protective enclosure for the spring 20 and also the head mechanism 10 to prevent these elements from being damaged.

Although only a certain and specific limited embodiment of the invention has been shown, it will be apparent from the spirit of the teachings of the present invention that many modifications are possible thereof without departing from the true concept of this invention.

The embodiments of the invention in which an exclusive property or privilege is claimed are defined as follows:

1. A magnetic transducer assembly comprising an elongated hollow housing member, an aperture formed in the wall of said housing, a head block adapted to be inserted in said aperture and to be freely movable therein along the axis of said aperture, said head block having opposing surfaces one internal to the housing and the other external to the housing, a transducer element mounted in said block with its pole pieces terminated near the external surface of said block, an elongated flexure spring means disposed within said housing having a pair of tine portions, bearing means interposed between each of said tine portions and the internal surface of said head block, a concave anchor surface within the housing on which the end of said flexure spring opposite said tine portions is mounted, a pair of screw holes formed in the mounting end of said flexure spring, said holes being in substantial alignment with the respective tine portions of said spring means, and separate screw means passing through each of said holes and into said anchor surface, said screw means being individually adjustable to bring said flexure spring down onto said anchor surface and to vary separately the bias on each of said tine portions whereby the external surface of said head block may be leveled.

2. A structure as set forth in claim 1 wherein the aperture is formed toward one end of the housing member and the flexure spring is anchored at the other end thereof.

3. A structure as set forth in claim 1 wherein said bearing means comprises a pair of ball members one for each of the tined portions of the flexure spring.

4. The structure of claim 1 wherein said head block is rectangular in shape and said aperture is also rectangular in shape.

5. The structure of claim 1 wherein the external surface of said head block is flanged and wherein a stop means extends away from the head body at a peripheral location near the internal surface thereof.